Sept. 20, 1927. 1,643,262
A. P. STEINER
HYDRAULIC WORK CARRIAGE CONTROL
Filed June 21, 1926 2 Sheets-Sheet 1
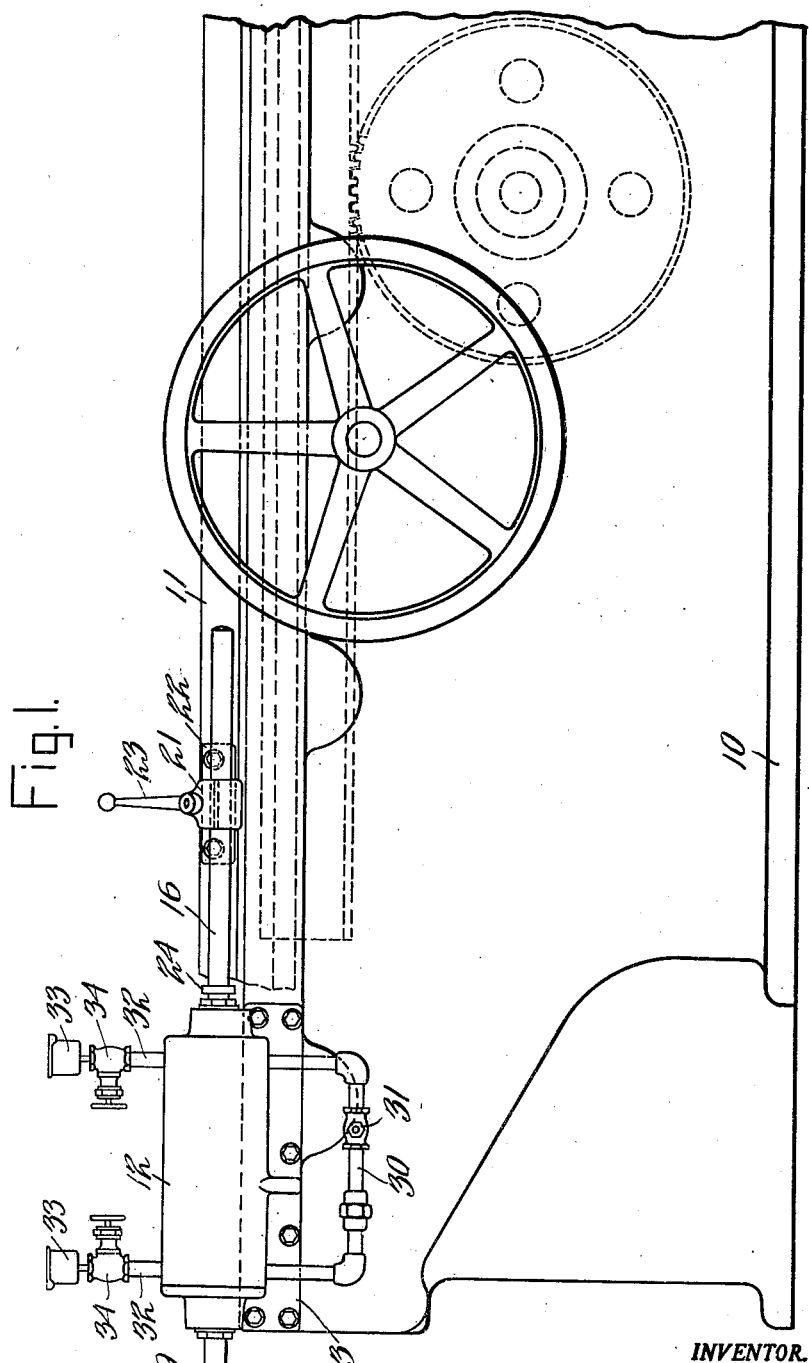
INVENTOR.
Amos. P. Steiner.
BY
ATTORNEYS.

Sept. 20, 1927.
A. P. STEINER
1,643,262
HYDRAULIC WORK CARRIAGE CONTROL
Filed June 21, 1926   2 Sheets-Sheet 2
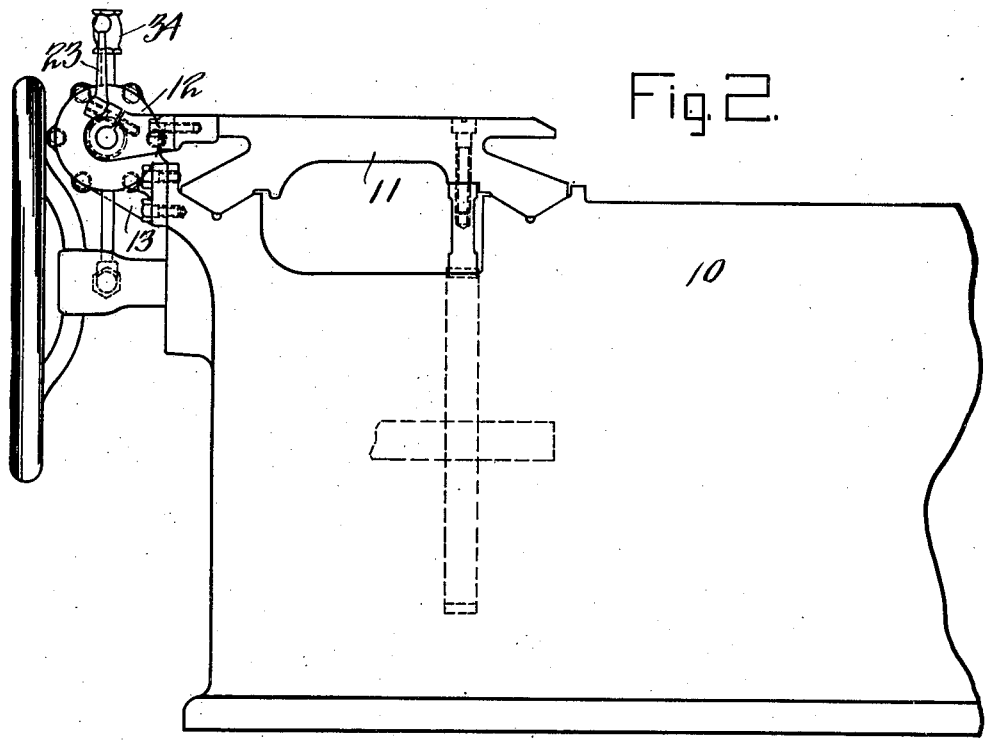
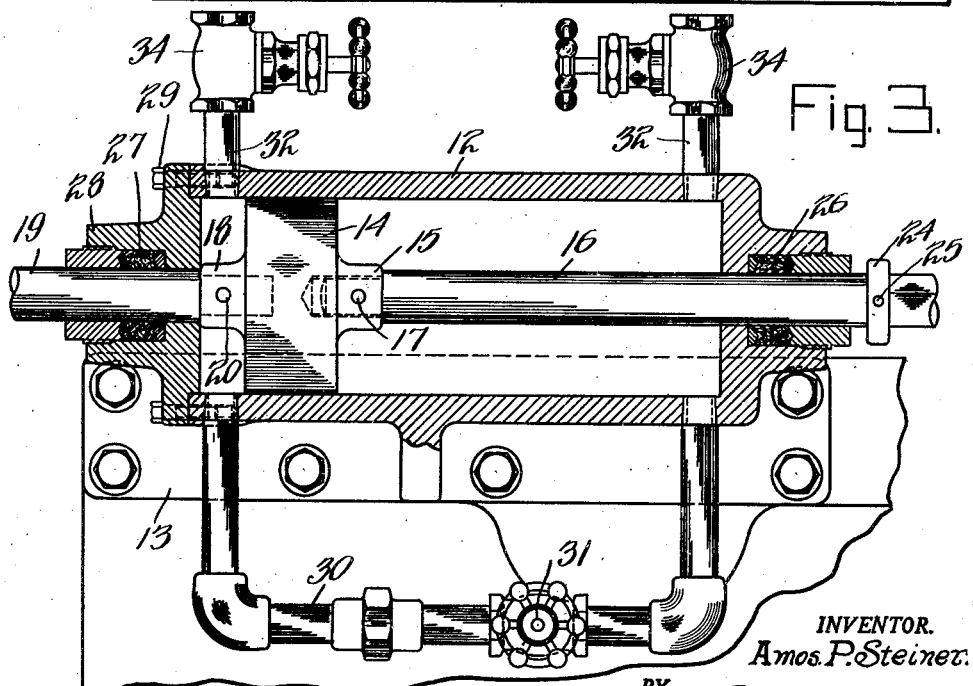
INVENTOR.
Amos. P. Steiner.
BY
ATTORNEYS.

Patented Sept. 20, 1927.

1,643,262

UNITED STATES PATENT OFFICE.

AMOS P. STEINER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA.

HYDRAULIC WORK-CARRIAGE CONTROL.

Application filed June 21, 1926. Serial No. 117,543.

My invention relates to a device for controlling the movement of the reciprocating carriage of a hydraulically operated grinding machine or other similar mechanism and it is an object of the invention to provide means for maintaining a uniform movement of the carriage, particularly at slow speeds.

In operating the carriage of a device of this character at slow speed it is necessary to by-pass a large amount of the pressure fluid back to the reservoir which stirs up the fluid in said reservoir and forms bubbles of air. A mixture of air and pressure fluid is drawn through the pressure line into the motor which operates the carriage and since the air is compressible the mixture cannot impart a positive motion to the propeller of the motor as the force required to start the carriage is greater than that required to keep it going and the pressure fluid which enters the motor must be compressed until it exerts a force sufficiently great to move the carriage. As soon as inertia is overcome and the carriage begins to move, less force being required to keep it going or its resistance to the pressure fluid decreasing causes the carriage to jump forward and stop since the mixture of pressure fluid and air expands more rapidly than it is supplied. For this reason the carriage must remain stationary until sufficient pressure is built up to start it again. In order to overcome this tendency of the carriage to jump I provide the control device which is filled with fluid free from air and therefore incompressible and when the pressure fluid has been compressed until it overcomes the resistance of the carriage the carriage will begin to move gradually but will be prevented from jumping since it acts against a bed of incompressible fluid, the movement of which is controlled by a needle valve set to permit the desired flow therethrough to cause the carriage to move at any desired speed, all as will be hereinafter more fully described and claimed.

Referring to the accompanying drawings, which are made a part hereof and on which similar reference characters indicate similar parts, Figure 1 is a fragmentary front elevation of a grinding machine illustrating the application of my invention, Figure 2, an end elevation, and Figure 3, a front elevation partly in section of the control device.

In the drawings reference character 10 indicates a stationary bed of a hydraulically operating grinding machine or the like upon which is mounted a reciprocable carriage 11. A cylinder 12 is mounted by means of a bracket 13 upon the bed 10. A piston 14 is mounted in said cylinder, said piston being provided with a central boss or extension at each side. The boss 15 at one side of the piston is internally threaded for the reception of a piston rod 16 secured therein by means of a pin 17 and a boss 18 at the opposite side of the piston having a tail rod 19 fastened therein by means of a pin 20. The tail rod 19 is provided in order that the piston may have the same surface area at each side to cause the pressure fluid to be acted upon in the same manner regardless of the direction of travel of the piston. The outer end of the piston rod 16 extends along the carriage 11 and a clamp 21 mounted on the carriage by means of a bracket 22 and provided with a handle 23 is adapted to clamp the rod and carriage together so that the piston 14 will move simultaneously in fixed relation with the carriage. A collar 24 is secured by means of a pin 25 on the piston rod and limits the adjustment of the clamp and rod. By adjusting the relative position of the piston and the carriage the limit of movement of the carriage may be varied as desired. The cylinder 12 is provided at one end with an integral head or end closure having an opening through which the piston rod 16 extends and provided with a stuffing box 26 for preventing the escape of fluid from the cylinder around the rod. A removable closure plate 27 is provided for the opposite end of the cylinder, said closure plate being provided with an opening permitting the tail rod to slide therethrough and with a stuffing box 28 and adapted to be held in position at the end of the cylinder by means of bolts 29. In order to cause the piston 14 to travel slowly at a uniform rate of speed and not jump I fill the cylinder 12 with noncompressible liquid such as oil and provide a communicating passage between the opposite ends of the cylinder by means of a pipe line 30 and in order to control the amount of fluid passing through the pipe line I insert therein a needle valve 31. With this construction since there is an incompressible body of fluid on each side of the piston, movement of the piston in one direction will force the body of fluid through the pipe line 30 around to the opposite side of the piston and prevent any unsteady or irregular motion of the piston. In order to account for any possible leakage from the cylinder I provide a pipe 32 at each end of the cylinder upon which is mounted an oil cup 33 and a valve 34 is provided for admitting oil through said pipe into the cylinder and adapted to be closed to prevent pressure of the fluid within the cylinder from passing out through the pipe.

In the operation of the device when a very slow traverse speed is desired the clamp 21 is operated to fasten the piston rod to the carriage at a point to allow the desired length of travel. The piston 14 moves with the carriage 11 and the pressure fluid in the cylinder moves from one side of the piston to the other from the pipe line 30 past the needle valve 31, said valve having been adjusted to govern the flow of liquid therethrough in accordance with the speed desired. Since the pressure fluid of the motor has been compressed to a point where it overcomes resistance of the carriage the carriage will move at a uniform speed instead of jumping.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A controlling mechanism for a reciprocating device comprising a cylinder, a piston in said cylinder, incompressible fluid in said cylinder on both sides of said piston, a piston rod having one end connected to said piston and having the other end connected to the reciprocating device, a fluid passage forming communication between the extremities of said cylinder, and adjustable means for connecting the piston rod and device for varying the length of travel of the device, substantially as set forth.

2. A controlling mechanism for a reciprocating device comprising a cylinder, a piston in said cylinder, incompressible fluid in said cylinder on both sides of said piston, a piston rod having one end connected to said piston and having the other end connected to the device, a fluid passage forming communication between the extremities of said cylinder, means for controlling the flow of fluid through the piston rod and device for varying the length of travel of the device, substantially as set forth.

3. The combination of a machine frame, a carriage mounted to reciprocate on said frame, a cylinder mounted on said frame in parallel relation to said carriage, a piston in said cylinder, a passage forming communication between the inner ends of the cylinder, and means for adjustably connecting the piston and carriage in fixed relation whereby the carriage and piston will operate simultaneously, substantially as set forth.

4. The combination of a machine frame, a carriage mounted to reciprocate on said frame, a cylinder mounted on said frame in parallel relation to said carriage, a piston in said cylinder, a passage forming communication between the inner ends of the cylinder, means for connecting the piston and carriage in fixed relation whereby the carriage and piston will operate simultaneously, and adjustable means for connecting the piston rod and device for varying the length of travel of the device, substantially as set forth.

5. The combination of a machine frame, a carriage mounted to reciprocate on said frame, a cylinder mounted on said frame in parallel relation to said carriage, a piston in said cylinder, a passage forming communication between the inner ends of the cylinder, means for connecting the piston and carriage in fixed relation whereby the carriage and piston will operate simultaneously, means for controlling the flow of fluid through said fluid passage, and adjustable means for connecting the piston rod and device for varying the length of travel of the device, substantially as set forth.

In witness whereof, I have hereunto set my hand at Waynesboro, Pennsylvania, this 15th day of June, A. D. nineteen hundred and twenty-six.

AMOS P. STEINER.